(12) United States Patent
Kellens et al.

(10) Patent No.: US 7,615,241 B2
(45) Date of Patent: Nov. 10, 2009

(54) VAPOR SCRUBBING PROCESS AND APPARATUS

(75) Inventors: Marc Kellens, Muizen (BE); Wim De Greyt, Sinaai (BE)

(73) Assignee: De Smet Engineering n.v., Zaventern (BE)

( * ) Notice: Subject to any disclaimer, the term of this patent is extended or adjusted under 35 U.S.C. 154(b) by 487 days.

(21) Appl. No.: 11/226,758

(22) Filed: Sep. 14, 2005

(65) Prior Publication Data

US 2006/0057263 A1 Mar. 16, 2006

(30) Foreign Application Priority Data

Sep. 15, 2004 (EP) ................. 04077550

(51) Int. Cl.
*B01D 53/14* (2006.01)
(52) U.S. Cl. ............ 426/431; 95/190; 95/206; 95/237; 96/234; 210/634; 426/417
(58) Field of Classification Search ........ 95/237–240, 95/205–209, 188, 190; 210/634; 426/431, 426/417; 96/234
See application file for complete search history.

(56) References Cited

U.S. PATENT DOCUMENTS

| 1,988,648 | A |   | 1/1935  | Engelke          |
|-----------|---|---|---------|------------------|
| 2,383,599 | A | * | 8/1945  | Ashmore ........ 554/167 |
| 2,416,484 | A | * | 2/1947  | Kremers ........ 544/274 |
| 2,461,694 | A |   | 2/1949  | McCubbin et al.  |
| 2,470,652 | A |   | 5/1949  | Scofield         |
| 2,571,143 | A |   | 10/1951 | Leslie           |
| 2,674,609 | A |   | 4/1954  | Beal et al.      |
| 2,678,327 | A |   | 5/1954  | Clayton          |
| 2,691,830 | A |   | 10/1954 | Karnofsky        |
| 2,713,023 | A |   | 7/1955  | Irvine           |
| 2,746,168 | A |   | 5/1956  | Rickabaugh       |
| 2,804,427 | A |   | 8/1957  | Suriano          |
| 2,826,601 | A |   | 3/1958  | Barsky           |
| 2,983,612 | A |   | 5/1961  | Eichberg         |
| 3,310,487 | A |   | 3/1967  | Johnson et al.   |
| 3,367,034 | A |   | 2/1968  | Good             |
| 3,367,044 | A |   | 2/1968  | Fitch            |
| 3,389,974 | A |   | 6/1968  | Brattini et al.  |
| 3,392,455 | A |   | 7/1968  | Klingsbaker, Jr. et al. |

(Continued)

FOREIGN PATENT DOCUMENTS

BE        877839         1/1980

(Continued)

OTHER PUBLICATIONS

Andersen, Refining of Fats and Oils, 2$^{nd}$ Edition, Pergamon Press, United Kingdom, 1962, pp. 187-199.

(Continued)

*Primary Examiner*—Duane Smith
*Assistant Examiner*—Ives Wu
(74) *Attorney, Agent, or Firm*—Wegman, Hessler & Vanderburg

(57) ABSTRACT

The invention provides a process and an apparatus for scrubbing vapours generated during the vacuum stripping step of fatty glycerides, said process comprising bringing said vapours in contact with their liquid condensate and extracting said liquid condensate with a polar extraction solvent or solvent mixture.

14 Claims, 1 Drawing Sheet

U.S. PATENT DOCUMENTS

| | | | |
|---|---|---|---|
| 3,634,201 A | 1/1972 | Kehse | |
| 3,966,445 A | 6/1976 | Adams | |
| 4,049,686 A | 9/1977 | Ringers et al. | |
| 4,089,880 A | 5/1978 | Sullivan | |
| 4,138,230 A | 2/1979 | Thompson | |
| 4,164,506 A | 8/1979 | Kawahara et al. | |
| 4,415,443 A | 11/1983 | Murphy | |
| 4,465,703 A * | 8/1984 | Jasko et al. | 426/607 |
| 4,601,790 A | 7/1986 | Stage | |
| 4,664,784 A | 5/1987 | Harandi | |
| 4,778,489 A | 10/1988 | Weber | |
| 4,996,072 A | 2/1991 | Marschner et al. | |
| 5,041,245 A | 8/1991 | Benado | |
| 5,214,171 A | 5/1993 | Dijkstra et al. | |
| 5,401,867 A | 3/1995 | Sitzmann et al. | |
| 5,486,318 A | 1/1996 | McKeigue et al. | |
| 6,001,220 A | 12/1999 | Hillström et al. | |
| 6,013,817 A | 1/2000 | Stern et al. | |
| 6,127,560 A | 10/2000 | Stidham et al. | |
| 6,172,247 B1 | 1/2001 | Copeland et al. | |
| 6,172,248 B1 | 1/2001 | Copeland et al. | |
| 6,426,423 B1 | 7/2002 | Copeland et al. | |
| 6,623,604 B1 | 9/2003 | Elsasser et al. | |
| 6,953,499 B2 | 10/2005 | Kellens et al. | |
| 2002/0169033 A1 | 11/2002 | Sery | |
| 2003/0070317 A1 | 4/2003 | Anderson et al. | |
| 2003/0097842 A1 | 5/2003 | Jellema et al. | |
| 2005/0066823 A1 | 3/2005 | Kellens et al. | |
| 2006/0030012 A1 | 2/2006 | Kellens et al. | |
| 2008/0051599 A1 | 2/2008 | Adami et al. | |
| 2008/0081097 A1 | 4/2008 | Kellens et al. | |

FOREIGN PATENT DOCUMENTS

| | | |
|---|---|---|
| BE | 1005617 A3 | 11/1993 |
| DE | 382912 | 10/1923 |
| DE | 552532 | 6/1932 |
| DE | 1285983 | 1/1969 |
| DE | 2524545 A1 | 12/1975 |
| DE | 265 074 A1 | 2/1989 |
| DE | 19520675 A1 | 12/1996 |
| EP | 0195991 A2 | 10/1986 |
| EP | 0520097 A1 | 12/1992 |
| EP | 1157615 A2 | 11/2001 |
| EP | 1505145 B1 | 6/2006 |
| EP | 1624047 B1 | 10/2006 |
| EP | 1637201 B1 | 8/2007 |
| EP | 1818088 A1 | 8/2007 |
| EP | 1894913 A1 | 3/2008 |
| EP | 1905815 A1 | 4/2008 |
| FR | 2103267 | 4/1972 |
| GB | 589534 | 6/1947 |
| GB | 777413 | 6/1957 |
| GB | 789777 | 1/1958 |
| GB | 816522 | 7/1959 |
| GB | 1229266 | 4/1971 |
| GB | 1400836 | 7/1975 |
| GB | 1424049 | 2/1976 |
| GB | 1 429 773 A | 3/1976 |
| GB | 1429773 * | 3/1976 |
| GB | 1561494 | 2/1980 |
| GB | 2100613 A | 1/1983 |
| GB | 2176713 | 1/1987 |
| GB | 2451577 A | 2/2009 |
| JP | 7-284643 | 10/1995 |
| JP | 2002/210399 A | 7/2002 |
| WO | WO 86/04603 A1 | 8/1986 |
| WO | WO 99/53001 A1 | 10/1999 |
| WO | WO 02/062157 A2 | 8/2002 |
| WO | WO 2005/100519 A1 | 10/2005 |
| WO | WO 2007/082766 A1 | 7/2007 |

OTHER PUBLICATIONS

Erickson, Practical Handbook of Soybean Processing and Utilization, AOCC Press, Champaign, IL, 1995, pp. 246-249.

Minifie, Chocolate, Cocoa, and Confectionery, Science and Technology, $2^{nd}$ Edition, AVI Publishing Company, Inc., Westport, CT, 1980, pp, 66-88.

O'Brien at al., Introduction to Fats and Oils Technology, $2^{nd}$ Edition, AOCS Press, Champaign, IL, 2000, pp. 256-258.

European Search Report (EP 04077550) (mailed Feb. 24, 2005).

Office Action (U.S. Appl. No. 10/912,361), mailed Nov. 13, 2008.

U.S. Appl. No. 12/175,837, filed Jul. 18, 2008, Kellens et al.

U.S. Appl. No. 12/175,859, filed Jul. 18, 2008, Van Damme.

Kuroda et al., "An Edible Oil Deodorizer with a Direct-Fired Heater," *J. Am. Oil Chem. Soc.* 66:1781-1783, 1989.

Van Gerpen et al., *Biodiesel Production Technology*, U.S. Department of Commerce, Jul. 2004.

Weber et al., "Fat Crystallizers with Stirring Surfaces: Theory and Practice," *OCL Oléagineux* 5:381-384, 1998.

English Language Explanation of BE 877839.

English Language Explanation of BE 1005617 A3.

English Language Explanation of DE 552532.

English Language Explanation of DE 19520675 A1.

English Language Explanation of JP 7-284643.

English Language Explanation and Machine Translation of JP 2002/210399 A.

European Search Report for European Patent Application No. 06017333 completed Feb. 23, 2007.

European Search Report for European Patent Application No. 07075709 completed Nov. 21, 2007.

European Search Report for European Patent Application No. 07075840 completed Jan. 29, 2008.

European Search Report for European Patent Application No. 0602388 completed Mar. 28, 2007.

Office Action (U.S. Appl. No. 11/841,255), mailed Sep. 19, 2008.

Office Action (U.S. Appl. No. 10/912,361), mailed Mar. 19, 2008.

Office Action (U.S. Appl. No. 11/198,084), mailed Jul. 9, 2008.

Office Action (U.S. Appl. No. 11/198,084), mailed Dec. 3, 2007.

* cited by examiner

VAPOR SCRUBBING PROCESS AND APPARATUS

CROSS-REFERENCE TO RELATED APPLICATIONS

This application claims priority to European patent application 04077550.4, filed Sep. 15, 2004, which is hereby incorporated by reference.

TECHNICAL FIELD OF THE INVENTION

The invention relates to a process and an apparatus for scrubbing vapours generated in a vacuum stripping process as used in the deodorisation or steam refining of edible oils and fats, i.e. fatty glycerides from now onwards referred to as oils.

BACKGROUND OF THE INVENTION

Edible oils and fats such as but not limited to cocoa butter, when obtained by expelling and/or solvent extraction, often require extensive purification. Accordingly, they can be degummed, neutralised, bleached and/or deodorised. During the deodorisation treatment, the oil to be deodorised is first of all deaerated, then heated under vacuum to a deodorisation temperature and then sparged with a stripping medium which is usually steam. After sufficient stripping medium has been passed through the oil, it is cooled by heat exchange, first with incoming oil and then with cooling water to yield fully refined oil.

As a result of a low pressure (about 2-8 hPa), an elevated temperature (about 140-270° C.) and the use of a stripping medium such as steam, the most volatile constituents of the oil to be deodorised enter the gas stream being passed through the oil and are thus effectively removed from the oil. These volatile constituents can be malodorous compounds but can also be free fatty acids still present in the oil. In the latter case, the deodorisation process is commonly referred to as a physical refining or steam refining process.

The low pressure inside the deodoriser is usually maintained by the use of steam ejectors. Accordingly, the deodoriser is connected via a vacuum duct to the inlet of a booster pump or two booster pumps in series. High pressure motive steam is also supplied to this booster pump with the result that the vapour stream leaving the booster pump comprises stripping steam, volatile constituents stripped from the oil, some non-condensable gases and motive steam.

Formerly, it was not uncommon to pass this vapour stream to a direct condenser wherein the stream is treated with water as a result of which the volatile constituents stripped from the oil condense together with most of the water vapour contained in this vapour stream. The condenser is connected via barometric legs to a hotwell where the condensate is separated into an organic upper layer and an aqueous lower layer. The organic upper layer is then collected by decantation and the aqueous lower layer is re-circulated via a cooling tower. This process has been described for instance by A. J. C. Andersen, in 'Refining of oils and fats', second edition, Pergamon Press, 1962, pages 187-198. Because of the smells released by this cooling tower and its tendency to foul, modern systems prefer to scrub the vapour stream leaving the deodoriser before condensing most of the water contained in this stream in the condenser of the steam ejector battery (see for instance "*Introduction to fats and oils technology*", second edition (2000), edited by R. D. O'Brien, W. E. Farr and P. J. Wan, AOCS Press, Champaign, pages 256-258). This scrubbing process entails passing said vapour stream through a scrubber device or scrubbing vessel in which an intimate contact is established between this vapour stream and the cooled condensate that is being circulated over said scrubber device or scrubbing vessel. The intimate contact between the vapour stream and the liquid condensate is commonly established by spraying the condensate into the vapour stream or by the use of a column packing. As a result, the least volatile constituents of this vapour stream condense onto said cooled condensate and, in doing so, increase its volume and raise its temperature. Accordingly, the condensate circulation system will comprise an indirect heat exchanger to control the condensate temperature and a bleed valve to control the amount of condensate in circulation, whereby this bleed valve will be connected to an intermediate storage for the deodorisate or fatty acid distillate.

In order to attain the highest degree of condensation of the least volatile constituents present in the vapour stream leaving the deodoriser, the temperature of the condensate circulating over the scrubber device or scrubbing vessel is preferably maintained just above the melting point of the condensate. In industrial practice this may, for example, be about 65-70° C. when the edible oil to be treated is cocoa butter.

In US-A1-2003/0097842, an apparatus for condensing a water-containing fluid is described. In this document, vapours evacuated from a deodoriser are passed over one of two low-temperature surface condensers, this system being also referred to as "dry condensing". In this dry condensing system, the condenser that is in operation is kept at for instance −28° C., so that not only the least volatile constituents in said vapours will condense but also the steam used as stripping medium and as motive ejector steam. As a result, the condenser that is in operation will gradually be filled with solid condensate. The condenser that is not in operation is thawed in order to release its condensate and the vapour stream is switched from the one condenser to the other at regular intervals.

The operation of the above described systems relies upon the condensate being fully liquefiable so that it can be pumped in the scrubber systems and drains away when the dry condensers are thawed. However, when certain oils such as, but not limited to, cocoa butter are deodorised, the resulting condensate may contain one or more high melting constituents that prevent the condensate from melting completely under the operational conditions disclosed above. These high melting constituents may also be reasonably volatile so that they can be stripped out of the oil and then cause problems in the scrubber. Although, as illustrated hereinafter, this problem is of major concern for cocoa butter, it may also to some extent happen with illipe butter (used as cocoa butter equivalent component), sesame oil (due to the presence of about 1% sesamin, having a molecular weight of 354, melting at 123° C. and boiling at 235° C. under a pressure of 0.01 mm Hg), lanolin (due to the presence of a number of polyterpene alcohols such as lanol melting at 141° C. and agnol melting at 164° C.) and shea butter (due to the presence of β-amyrin having a molecular weight of 427, melting at about 187° C. and boiling at 260° C. under a pressure of 0.8 mm Hg, and the presence of lupeol having a molecular weight of 427 and melting at 215° C.). The foregoing is provided only as an illustration of what is meant herein as "high melting constituents" with respect to the present invention.

In the production of cocoa butter, cocoa beans, which have already been fermented after having been harvested, are first of all broken so that the shells can be separated from the kernels by winnowing. Then the cocoa kernels are treated with a concentrated alkaline solution, for example potassium carbonate, which treatment generates the typical chocolate flavour. Subsequently, the cocoa kernels or nibs are roasted and then ground in order to form cocoa liquor. Pressing this cocoa liquor yields both cocoa butter and cocoa powder.

World-wide about one third of the annual cocoa bean harvest of some three million tonnes is incorporated in chocolate as cocoa liquor. The remaining two thirds are separated into butter, which is then used in the manufacture of chocolate, and powder. Cocoa butter may be produced in three ways, i.e. by pressing, by screw expelling and by solvent extraction. Depending upon the way of producing, three grades of cocoa butter may be distinguished.

Prime pressed cocoa butter may be filtered, degummed with water or dilute citric acid and deodorised without loosing its denomination. Alkali refining and bleaching are only permitted for the lower grades of cocoa butter. Most chocolate manufacturers want to use a cocoa butter with an almost neutral taste. Therefore, deodorisation during the manufacturing process of cocoa butter is quite common. This means that annually some 800,000 tons of cocoa butter are deodorised, especially now that the pressing and expelling operations are moving towards the countries of origin.

According to B. W. Minifie in 'Chocolate, cocoa and confectionery, science and technology', AVI publishing Company Inc. Westport Conn., second edition, 1980, cocoa kernels or nibs contain about 1.5 weight % theobromine and 0.15 weight % caffeine. Because theobromine is only poorly soluble in fat, most of the theobromine remains in the powder on pressing. According to the 'Sigma Product Information Sheet', which has been reproduced below as table 1, cocoa powder may contain as much as 2.6 weight % theobromine whereas cocoa butter may contain as little as 0.01 weight % theobromine. On the other hand, the caffeine content of the crude cocoa butter is not that drastically reduced in comparison with the caffeine content of the cocoa nibs.

As shown in table 1, theobromine and caffeine have quite low molecular weights of 180 and 194 respectively so that they are quite volatile and sublime at atmospheric pressure at 290-295° C. and 178° C. respectively. As exemplified by the low theobromine and caffeine content of commercial cocoa butter, the deodorisation process almost completely removes these alkaloids from the cocoa butter. Consequently, the deodorisation distillate may exhibit a substantial alkaloid content.

TABLE 1

|  | Theobromine | Caffeine |
| --- | --- | --- |
| Molecular formula | $C_7H_8N_4O_2$ | $C_8H_{10}N_4O_2$ |
| Molecular weight | 180.17 | 194.20 |
| Melting point (° C.) | 357 | 235-238 |
| Boiling point (° C.) | 290-295 (sublimes) | 178 (sublimes) |
| pH (1% solution) | N.A. | 6.9 |
| pKa | 9.9 | 14.0 at 25° C. |
| Specific density | N.A. | 1.2 |
| Appearance | White powder | Odourless white powder or crystals with a bitter taste |
| Solubility (1 g/ml) in: |  |  |
| water at 20° C. | 2000 | 60 |
| water at 100° C. | 150 | 1.5 (solubility increases by adding a diluted acid) |

TABLE 1-continued

|  | Theobromine | Caffeine |
| --- | --- | --- |
| ethanol | 2220 | 66 |
| Strong alkalis | forms stable compound | decomposed |
| Amount (%) in |  |  |
| cocoa beans | 0.88-4.23 | 0.062-0.416 (average 0.214) |
| cocoa powder | 2.6 | 0.1-0.5 |
| cocoa butter | 0.008 | 0.038 |
| milk chocolate | 0.1-0.5 | 0.021 |
| dark chocolate | 1 | 0.17 |

Given the melting points of alkaloids such as theobromine and caffeine, it is not surprising that the condensate originating from cocoa butter deodorisation easily solidifies and thereby causes all kinds of deposits and blockages in the deodorisation equipment and especially in its scrubber section. These deposits are very difficult to remove. The alkaloids hardly dissolve in a non-polar solvent and when a polar solvent is used, the oily constituents of the deposits prevent this solvent from reaching the alkaloids. Consequently, manual cleaning using a hammer and chisel is often the only way to get rid of these deposits.

SUMMARY OF THE INVENTION

It is an object of the present invention to provide a process and an apparatus for preventing or minimising deposits of solidified condensate in a deodoriser and particularly in the scrubber section of the deodoriser during deodorisation or steam refining of fatty glycerides, to be referred to as oils and fats such as, but not limited to, cocoa butter.

It is another object of the present invention to provide a process and an apparatus that are applicable to both batch and continuous deodorisation of oils.

It is another object of the present invention to isolate high melting components stripped from certain oils such as, but not limited to, alkaloids stripped from cocoa butter.

These and other objects which will become apparent from the description hereinafter are accomplished by a process and an apparatus such as defined below.

It has surprisingly been found that problems arising when the condensate is not fully liquefiable, especially problems due to the presence of one or more high melting components, can significantly be solved, in particular deposits in the deodoriser and especially in its scrubbing section can almost entirely be avoided, by washing the deodoriser condensate with a polar solvent as for instance water or a polar solvent mixture.

The present invention provides a process for scrubbing vapours generated during the vacuum stripping step of oils such as, but not limited to, cocoa butter. The process comprises bringing said vapours into contact with their liquid condensate and extracting the liquid condensate with a polar solvent or solvent mixture. The vacuum stripping process may for example be part of a deodorisation or steam refining process of an oil such as e.g. cocoa butter. Extraction of the liquid condensate by said polar solvent or solvent mixture may be effected continuously. Extracting the liquid condensate may for example be performed by using a mixer/settler.

The process according to the present invention is applicable to both batch and continuous deodorisation processes.

An advantage of the method of the present invention is that high melting constituents which may be present in the liquid condensate of oils may be effectively removed, thereby preventing them to solidify and blocking the deodorization equipment.

The polar solvent or solvent mixture may comprise any suitable food grade polar solvent. The polar solvent or solvent mixture may for example comprise water and/or one or more food grade lower alcohols such as ethanol or isopropanol, in various proportions. In one embodiment of the invention, the polar solvent may comprise a mixture comprising at least 50% by volume water and at most 50% by volume isopropanol.

According to the present invention, high melting components may be separated from the oil liquid condensate. The term "high melting components" should be understood herein as explained in the background of the invention with reference to illustrative embodiments thereof. These high melting components usually have a melting point significantly higher than glycerides and fatty acids, preferably a melting point above 120° C., more preferably a melting point above 140° C. These high melting components may be recovered by cooling the polar solvent or solvent mixture and then allowing the high melting components to crystallise.

The present invention furthermore provides an apparatus for scrubbing a stream of vapours comprising malodorous and volatile compounds as a major component and impurities, preferably being high melting components, as minor components. The apparatus comprises:

- a scrubber section for condensing the vapours onto a liquid to form a liquid condensate,
- means for introducing a polar solvent or solvent mixture into the apparatus and for contacting said polar solvent or solvent mixture with the liquid condensate from the scrubber section, and
- an extraction means for extracting the liquid condensate with the polar solvent or solvent mixture, whereby the impurities are separated from the condensate.

The liquid present in the scrubber section may have substantially the same composition as the vapour being condensed. The extraction means may for example be a liquid/liquid extraction column or may, in another embodiment, be a mixer/settler.

An advantage of the apparatus according to the invention is that, by extracting the liquid condensate with one or more polar extraction solvent(s), the high melting components present in the liquid condensate formed in the scrubber section are prevented from solidifying in said scrubber section.

According to the invention, the apparatus may furthermore comprise a solvent removing means downstream from the extraction means for removing from the liquid condensate any polar solvent(s) still present in the liquid condensate after extraction. Moreover, the apparatus may comprise means for returning the liquid condensate from the extraction means to the inlet of the scrubber section.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
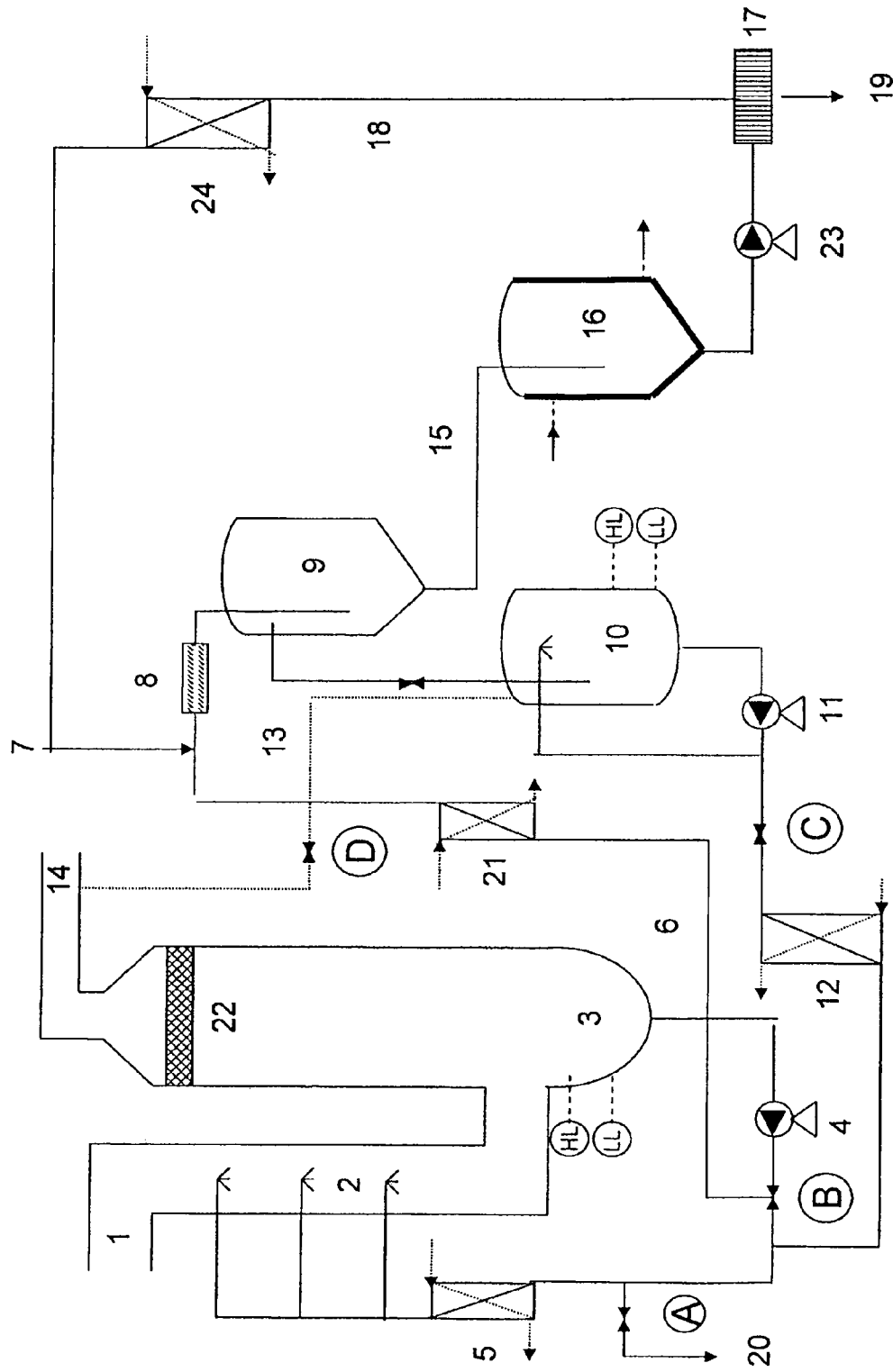
FIG. 1 is a schematic representation of an apparatus according to an embodiment of the invention.

The present invention will be described with respect to particular embodiments and with reference to the drawing but the invention is not limited thereto but only by the claims. The drawing described herein is only schematic and non-limiting. In the drawing, the relative dimensions of some of the elements may be enlarged or reduced (i.e. not drawn on scale) without departing from the scope of the invention.

As already described, deodorising usually is the final stage in oil refining, wherein odoriferous material, free fatty acids and/or other undesired minor components are removed in order to produce a bland oil with a good shelf life. In the deodorisation or steam refining processes of edible oils such as, but not limited to, cocoa butter, the purpose of a scrubber device or scrubber section is to remove organic vapours contained in the vapour stream, leaving the deodoriser shell, by condensing it onto a liquid, whereby this liquid has substantially the same composition as the vapours being condensed. In the further description, this liquid will therefore be referred to as a distillate or a condensate. In order to ensure an intimate contact between the vapours and this liquid, the liquid is sprayed down the vacuum duct connecting the deodoriser shell and the scrubbing vessel by means of one or more sprayers and/or is allowed to flow down a packed column fitted at the top of the scrubbing vessel. A packed column is filled with a suitable packing material of any type already known in the art, the main purpose of such packed column being to provide a very large contact area between the gas and scrubbing liquid. In both cases the liquid is collected at, or close to, the lowest point of the scrubbing vessel e.g. by means of a pump that circulates said liquid over said sprayer(s) and/or over said packed column. in order to compensate for the volume increase of the liquid by the condensation of the vapours, a level control in the scrubbing vessel can actuate a bleed valve connected to this circulation loop. In order to control the condensate temperature and to compensate for the latent heat of condensation and temperature decrease of the deodoriser vapours, a heat exchanger is commonly incorporated into this loop as well (for further details, see D. R. Erickson in "*Practical Handbook of Soybean Processong and Utilization*", AOCC Press, Champaign Il., 1995, pages 246-249).

With respect to the prior art deodorising process, the process according to the present invention now provides, after the one or more usual different steps of the deodorising process are performed, an additional process step of extracting or washing or scrubbing the deodoriser condensate with a polar solvent or solvent mixture. Determination of suitable amounts of the extraction solvent to be used with respect to the condensate to be extracted is well within the knowledge of the skilled person, depending upon parameters such as, but not limited to, cocoa butter acidity, alkaloid content of cocoa butter, temperature, solvent properties and the like. The extracting process may for example be a continuous extracting process. Therefore, according to the process of the present invention, the circulation loop furthermore comprises an extraction means, in which the circulating condensate is extracted with a polar solvent or solvent mixture, in order to prevent solidifying of the high melting constituents, which are present in the vapour stream. In addition, this loop may comprise a solvent removing means in which any polar solvent still present in the condensate after it has been extracted is removed from this condensate before it is returned to the scrubber. This removal may be effected by exposure to reduced pressure.

According to the invention, suitable polar extraction solvents are more preferably substantially immiscible with the deodoriser condensate. Furthermore, the density of the one or more extraction solvents should preferably substantially differ from the density of the deodoriser condensate in order to enable a sufficiently rapid phase separation during the extraction process. Phase separation efficiency and/or speed may further be improved, when needed, by dissolving e.g. one or more suitable inorganic salts into the polar solvent or solvent mixture. Any kind and amount of such salts that are suitable for changing the density of the one or more extraction solvents, i.e. for increasing the difference between the latter density and the density of the condensate, may be used. Furthermore, one or more acids may be added to the polar extraction solvent or solvent mixture in order to improve the dissolving characteristics of the latter with regard to the components of the condensate.

During this extraction stage of the process, impurities being high melting constituents migrate from the deodorisation condensate towards the polar extraction solvent or solvent mixture, whereby the extent of migration is determined by the partition coefficients of these components and by their initial concentration in the polar extraction solvent or solvent mixture. This means that, to ensure effective extraction of high melting constituents from the deodoriser condensate, a low concentration of the latter constituents in the extraction solvent should preferably be maintained.

Suitable polar extraction solvents which may be used in the process according to the invention, may for example comprise water, lower alcohols (i.e. preferably having from 2 to 3 carbon atoms), and food grade polyhydroxy compounds (preferably glycerol), and their mixtures in any proportions.

If water is used as the only extraction solvent, an economical way of maintaining the above mentioned low concentration of constituents in the water may be achieved by supplying the extraction means with additional fresh water and to (e.g. continuously or batchwise) discard as a waste effluent the portion of water that has already been used in the extraction means.

If isopropanol alone is used as a polar extraction solvent, a quite substantial portion of this extraction solvent would dissolve in the deodoriser condensate and, because of the relatively high vapour pressure of this solvent, it would be necessary to remove this dissolved isopropanol from the circulating stream of deodoriser condensate before this is exposed to the high vacuum maintained in the scrubber, so as to prevent its loss to the steam ejector system. This removal could, for example, entail spraying the isopropanol-containing condensate in vacuum and condensing the ensuing isopropanol vapour at very low temperature. This additional solvent processing would significantly increase costs of the scrubbing step as compared to the use of water as the major component of the polar solvent mixture.

Therefore in order to avoid the above mentioned disadvantage or complication of isopropanol as a single extraction solvent, in a useful embodiment of the invention a mixture comprising at least 50% by volume water and at most 50% by volume isopropanol, for example a 70/30 (volume/volume) mixture, may be used as the polar solvent mixture. In that case, hardly any isopropanol will dissolve in the deodoriser condensate when this is brought into contact with said mixture. Moreover, such water/isopropanol mixtures usually display a higher dissolving power than water for the high melting constituents to be extracted from the liquid condensate by the process of the present invention. Accordingly, and this is a further advantage of this preferred embodiment, the volume of the polar solvent mixture which is needed for a given extraction efficiency is lower for such water/isopropanol mixtures than for water alone. In this preferred embodiment, extraction may be carried out in several subsequent stages. In a first stage, the deodoriser condensate may be extracted with, for example, a suitable mixture of water and isopropanol such as above described, and in a second stage, the distillate may then be extracted with water alone in order to further remove any residual isopropanol from the condensate treated in the first stage.

In still other embodiments of the invention, alternative systems can apply to the mixer/settler such as, but not limited to, the following:

extraction is performed once with a single polar solvent (e.g. water), extraction is performed once with a mixture of polar solvents (e.g. aqueous isopropanol), extraction is performed more than once, optionally counter-current wise, with a single polar solvent, extraction is performed more than once, optionally counter-current wise, with a mixture of polar solvents, extraction is performed successively with different polar solvents or solvent mixtures (e.g. first with isopropanol and then with water).

According to the process of the present invention, the deodoriser condensate is preferably extracted to such an extent that partial solidification, after said condensate has been brought into contact with the vapours extracted from the deodoriser, is effectively prevented. This means that the degree of extraction, or rather the residual content of the high melting constituents, is in fact determined by the ratio of the flow rate of the vapour stream extracted from the deodoriser and the deodoriser condensate circulation rate, as well as by the concentration of the high melting components in the vapour stream, said ratios being as broadly described hereinbefore.

It is furthermore possible, according to the present invention, to recover the high melting constituents from the polar extraction solvent or solvent mixture in order to re-utilise said extraction solvent and avoid it becoming a waste effluent. Given the high melting point of the constituents to be removed from the deodoriser condensate by the process according to the invention, their recuperation from the polar extraction solvent or solvent mixture may preferably be carried out by cooling said polar extraction solvent and allowing the said high melting constituents to crystallise. After the high melting constituents have crystallised, they can then easily be removed by any means, for example filtration, and then isolated for separate valorisation (in particular in view of their well known therapeutic activity).

Recuperation of the high melting constituents and of the polar extraction solvent or solvent mixture thus involves cooling and re-heating the latter. In the process according to the invention, the deodoriser condensate may also be heated or cooled before being extracted with the polar solvent system, in order to increase the solubility of the high melting constituents in the polar extraction solvent system and hence, to improve extraction efficiency. However, since this may involve additional investment in heat exchangers and will cost some energy, extraction at the deodoriser condensate temperature may be preferred. Nevertheless, in order to increase the solubility of the high melting constituents, temperature may be raised from just above the solidification temperature to for instance close to the atmospheric boiling point of the polar extraction solvent system.

According to the invention, various extraction means well known for performing the extraction stage may be used. For example, in one embodiment, a liquid/liquid extraction column may be used. This will insure highly efficient extraction. However, since the extraction only aims at the prevention of solid formation and not necessarily at the complete removal of the high melting components, a more simple extraction system such as e.g. a mixer/settler may generally be preferred.

Since theobromine and caffeine are relatively volatile in that they sublime at atmospheric pressure at about 290° C. and 178° C. respectively and are therefore considerably more volatile than free fatty acids, they will be stripped out of cocoa butter almost entirely under deodorising conditions at temperatures in excess of 175° C. Their concentration in the vapour stream leaving the deodoriser will depend upon the amount originally present in the cocoa butter and the extent to which the acidity of cocoa butter is removed during the deodorisation process. Solvent extracted cocoa butter tends to contain more theobromine and caffeine, and also contains more free fatty acids, than cocoa butter obtained by pressing.

In general terms the process according to the invention prescribes that the rate of circulation of the deodoriser condensate over the scrubber and the extent of its extraction should be matched in such a way that the solubility of the high melting vapour constituents (e.g. theobromine or caffeine) is not exceeded in the cooler incorporated in the deodoriser condensate loop. This means for instance that the circulation rate of the condensate may have to be increased, or that the flow rate of the vacuum stripping steam has to be reduced, when processing a cocoa butter exhibiting a higher content of high melting components.

Given the solubility of theobromine and caffeine in the deodoriser condensate at a temperature of about 70° C., being about 500 ppm and about 20,000 ppm respectively, and taking into account that deodorisation of cocoa butter at 175° C. may generate a deodoriser condensate containing about 7,000 ppm theobromine and about 55,000 ppm caffeine, this means that the flow rate of the deodorisation condensate over the scrubber, when expressed as unit of mass per unit of time, should be at least about 10 times the flow rate of the organic vapour leaving the deodoriser, expressed in identical units, in order to prevent the solubility of the respective high melting compounds to be exceeded.

The solubility of caffeine in water is such that 1 g caffeine only needs 1.5 ml boiling water to dissolve but needs 60 ml at ambient temperature (see table 1). Theobromine is less soluble in that 1 g requires 150 ml of boiling water to dissolve and 2000 ml at ambient temperature (see Table 1). Experimental measurements have shown that the partition coefficient of theobromine between boiling water and deodoriser condensate is about 6 and that this coefficient for caffeine is about 1.6. Fortuitously, water turns out to be a better extraction solvent for theobromine than for caffeine and thus ensures a low residual theobromine content, which is important since its low solubility in the deodoriser condensate necessitates its almost complete extraction to prevent solids formation.

The process according to the invention can be used both for batch and continuous deodorisation systems. In both cases, previously generated deodoriser condensate with a sufficiently low content of high melting constituents will already be present in the scrubber system at start-up, so that this condensate can be circulated over the scrubber system as soon as vapours are being extracted from the deodoriser. In this context it is immaterial if the composition of the condensate present in the scrubber system is the same as the composition of the vapours to be scrubbed. This means that the process of the invention can also be profitably used in deodorisers undergoing more or less frequent feedstock changes.

Whereas the process according to the invention aims to prevent high melting constituents present in the vapours being extracted from the deodoriser from being deposited in the scrubber and especially in the cooler incorporated in the condensate loop, other means to prevent such deposits should also be encouraged. Accordingly cold spots in the vapour duct connecting the deodoriser to the scrubber should be rigorously avoided. In fact the length of the duct should preferably be minimised so that the scrubber vessel is close to the deodoriser vessel. Incorporating the scrubber inside the deodoriser is considered to be even more preferable.

Because not all deodoriser condensates may equally profit from the process according to the present invention, it may be advantageous to provide a system in the circulating loop allowing the extraction means of the process according to the invention to be by-passed.

In view of the illustration of an apparatus according to the invention, reference is now made to FIG. 1. This apparatus comprises a standard scrubbing system where vapours leaving the deodoriser through vapour duct 1 are brought into contact with deodoriser condensate being sprayed downwards in vapour duct 2. Non-condensable vapours and condensate droplets then move into the scrubber vessel 3. Because of the partial condensation of the vapours in vapour duct 2 and the larger diameter of scrubber vessel 3 in comparison with vapour duct 2, the vapour velocity in scrubber vessel 3 is considerably lower than in vapour duct 2. Consequently, most condensate droplets sink to the bottom of the scrubber vessel 3 and only very small condensate droplets are entrained by the vapour stream. Therefore, a demister (22) has been provided in the top of scrubber vessel 3 that causes said very small droplets to coalesce and then sink to the bottom of scrubber vessel 3. The vapour stream leaving scrubber vessel 3 via vapour duct 14 which is connected to the main deodoriser vacuum system (not shown), will therefore be substantially devoid of both liquid droplets and condensable vapour.

The scrubber condensate collects in the bottom of scrubber vessel 3 and is then circulated by means of circulating pump 4 to the sprayers located in vapour duct 2. Because of the latent heat of condensation of the vapours condensed onto the condensate in vapour duct 2, the condensate temperature will rise. Its temperature is therefore controlled in heat exchanger 5. Because of the condensation, the condensate volume will increase. This volume is therefore controlled by two level switches ("HL" and "LL") situated in the bottom of scrubber vessel 3 which actuate valve A allowing condensate to be drained to intermediate condensate storage 20.

The apparatus according to the invention also comprises means to extract the condensate with a polar solvent or solvent mixture. Then three-way valve B is set so that the circulating condensate passes through pipe 6, heat exchanger 12 and in-line mixer 8 to settling vessel 9. Just before the condensate stream enters mixer 8, polar solvent is added to said stream through pipe 7. In settling vessel 9, the polar solvent containing the high melting components extracted from the condensate will form the lower phase. This lower phase can be drained from vessel 9 through pipe 15 into the crystalliser vessel 16 which can for instance be provided with a double jacket. Pump 23 can feed the crystal slurry formed in crystalliser 16 to filter 17 from which the high melting constituents can be recovered as filter cake 19. The polar solvent stream 18 leaving the filter 17 and now substantially devoid of high melting constituents can be recycled after having been brought to extraction temperature in heat exchanger 24.

The top layer in settling vessel 9 is decanted into vessel 10 from where pump 11 transports the condensate towards the scrubber section of the apparatus. Control valve C which is actuated by the high and low level switches in the lower part of vessel 10 ensures that part of the output of pump 11 is returned to vessel 10 through a sprayer located in the top of vessel 10. By opening valve D, vessel 10 is connected to vacuum so that proper drying of the condensate is ensured before it is exposed to the vacuum in the scrubber section of the deodoriser.

Hereinafter, specific examples will be presented. It should be noted that these examples are only meant as an illustration and are not limiting the invention.

EXAMPLE 1

Crude cocoa butter comprising 84 ppm of theobromine and 423 ppm of caffeine, and having a free fatty acid content of about 1.5% by weight expressed as oleic acid, was deodorised at various temperatures. At each temperature, the period of deodorization was 60 minutes at a pressure of 3 mbar and 1.5 weight % of steam was passed through the molten cocoa butter.

Table 2 below clearly shows that an increase in the deodorization temperature within the range from 150° C. to 225° C. leads to a significantly more effective removal of free fatty acids (steam refining). This increased efficiency is reflected in both the amount of deodoriser distillate and its free fatty acid content as well as in the residual free fatty acid content of the deodorised cocoa butter. Table 2 also shows that an increased deodorization temperature also causes more theobromine and caffeine to be stripped out of the cocoa butter feedstock. In fact, a temperature of 150° C. already leads to a theobromine reduction by 27% and a caffeine reduction of 29% and, as caffeine is more volatile than theobromine, caffeine is removed to a larger extent than theobromine.

TABLE 2

| | Deodorization temperature | | | |
|---|---|---|---|---|
| | 150° C. | 175° C. | 200° C. | 225° C. |
| Deodoriser distillate | | | | |
| yield (%) | 0.24 | 0.68 | 1.31 | 1.55 |
| free fatty acid content | 76.9 | 88.4 | 89.5 | 93.2 |
| theobromine content (ppm) | 7,241 | 6,941 | 4,502 | 4,326 |
| caffeine content (ppm) | 77,216 | 54,432 | 31,094 | 25,524 |

TABLE 2-continued

| | Deodorization temperature | | | |
|---|---|---|---|---|
| | 150° C. | 175° C. | 200° C. | 225° C. |
| Deodorised cocoa butter | | | | |
| free fatty acid content | 1.31 | 0.97 | 0.37 | 0.06 |
| theobromine content (ppm) | 61 | 34 | 12 | 10 |
| caffeine content (ppm) | 300 | 111 | 17 | 9 |
| Removal (%) | | | | |
| theobromine | 27 | 60 | 86 | 88 |
| caffeine | 29 | 74 | 96 | 98 |

At 150° C., when the deodorisation process in the example given hardly removed any free fatty acids from cocoa butter, the removal of theobromine and caffeine was already 27% and 29% respectively. Accordingly, the distillate had an alkaloid content that was close to 10% by weight. Such distillates are solid at temperatures at which free fatty acids are still fully molten. If, therefore, such distillates are collected in fully molten distillates, it is only a matter of time before they will partially solidify and form deposits at cold spots that can cause blockages necessitating the deodorization process to be often interrupted for manual cleaning. This interruption and cleaning is effectively avoided by the process according to the invention.

EXAMPLE 2

Samples of deodoriser distillate with different alkaloid contents were mixed in various weight ratios with water at a temperature of 90° C., and various mixing times ranging from 1 to 30 minutes were applied. After the mixing stage, the mixture was transferred to a separating funnel, allowed to settle and subsequently, the two phases were collected separately and analysed for theobromine and caffeine content.

From table 3 below it is clear that theobromine is preferentially extracted from the deodoriser distillate. This is most fortuitous since this alkaloid has the highest melting point and, therefore, tends to cause most problems in the scrubber circuits. It is also clear from table 3 that a mixing time of 1 minute may be too short in order to establish the partition equilibrium when a large water-to-distillate ratio is employed. On the other hand, at water-to-distillate ratios around 1 or lower, such a short mixing time may be sufficient to attain equilibrium. These observations illustrate that a mixer/settler system will be effective in removing both alkaloids from the scrubber condensate.

TABLE 3

| | water/distillate ratio | | | |
|---|---|---|---|---|
| | 1.0 | 5.0 | 1.1 | 0.6 |
| mixing time (minutes) | 1.0 | 1.0 | 30.0 | 1.0 |
| distillate composition | | | | |
| theobromine (ppm) | 3,770 | 6,580 | 6,340 | 4,020 |
| caffeine (ppm) | 29,100 | 33,590 | 32,530 | 30,300 |

TABLE 3-continued

| | water/distillate ratio | | | |
|---|---|---|---|---|
| | 1.0 | 5.0 | 1.1 | 0.6 |
| mixing time (minutes) | 1.0 | 1.0 | 30.0 | 1.0 |
| composition extracted distillate | | | | |
| theobromine (ppm) | 520 | 450 | 910 | 970 |
| caffeine (ppm) | 11,240 | 5,740 | 13,250 | 15,460 |
| composition aqueous extract | | | | |
| theobromine (ppm) | 3,600 | 1,200 | 5,390 | 5,810 |
| caffeine (ppm) | 19,840 | 5,380 | 19,090 | 27,880 |
| partition coefficients (water/distillate) | | | | |
| theobromine | 6.92 | 2.67 | 5.92 | 5.99 |
| caffeine | 1.77 | 0.94 | 1.44 | 1.80 |

After having been cooled to ambient temperature, it was observed that the extracting water contains a white deposit. This deposit could be readily separated from its supernatant by decantation, thus enabling a process whereby the extraction solvent is recycled. This feature will be especially important when the extraction solvent contains alcohols in addition to water used in this example.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A process for scrubbing vapors generated during the vacuum stripping step of fatty glycerides, said process comprising bringing said vapors in contact with their liquid condensate, wherein said vapors being condensed and said liquid condensate have substantially the same composition and said process further comprises extracting said liquid condensate with a polar extraction solvent or solvent mixture, wherein the step of bringing the vapors in contact with their liquid condensate is performed at a pressure of about 2-8 hPa.

2. The process according to claim 1, wherein said fatty glyceride is cocoa butter.

3. The process according to claim 1, wherein said polar extraction solvent or solvent mixture comprises water.

4. The process according to claim 1, wherein said polar extraction solvent or solvent mixture comprises a lower alcohol having from 2 to 3 carbon atoms or a food grade polyhydroxy compound.

5. The process according to claim 1, wherein said polar extraction solvent mixture comprises at least 50% by volume water and at most 50% by volume isopropanol.

6. The process according to claim 1, wherein extraction of the liquid condensate by said polar extraction solvent or solvent mixture is effected continuously.

7. The process according to claim 1, wherein extracting the liquid condensate is performed by using a mixer/settler.

8. The process according to claim 1, whereby said liquid condensate comprises high melting components and said high melting components are extracted from the condensate and then recuperated from said polar extraction solvent or solvent mixture.

9. An apparatus for scrubbing a stream of vapors comprising malodorous volatile compounds and high melting components, said apparatus comprising: a scrubber section for condensing said vapors onto a liquid to form a liquid condensate, means for introducing a polar solvent or solvent mixture into said apparatus and for contacting said polar solvent or solvent mixture with the liquid condensate from the scrubber section, and an extraction means for extracting said liquid condensate with said polar solvent or solvent mixture, whereby said high melting components are separated from said liquid condensate, and further comprising means for returning said liquid condensate from the extraction means to the inlet of the scrubber section.

10. An apparatus apparatus for scrubbing a stream of vapors comprising malodorous volatile compounds and high melting components, said apparatus comprising: a scrubber section for condensing said vapors onto a liquid to form a liquid condensate, means for introducing a polar solvent or solvent mixture into said apparatus and for contacting said polar solvent or solvent mixture with the liquid condensate from the scrubber section, and an extraction means for extracting said liquid condensate with said polar solvent or solvent mixture, whereby said high melting components are separated from said liquid condensate, and further comprising a solvent removing means downstream from said extraction means for removing from said liquid condensate any polar solvent or solvent mixture still present in the liquid condensate after extraction, further comprising means for returning said liquid condensate from the extraction means to the inlet of the scrubber section.

11. An apparatus for scrubbing a stream of vapors comprising malodorous volatile compounds and high melting components, said apparatus comprising: a scrubber section for condensing said vapors onto a liquid to form a liquid condensate, means for introducing a polar solvent or solvent mixture into said apparatus and for contacting said polar solvent or solvent mixture with the liquid condensate from the scrubber section, and an extraction means for extracting said liquid condensate with said polar solvent or solvent mixture, whereby said high melting components are separated from said liquid condensate, and further comprising a solvent removing means downstream from said extraction means for removing from said liquid condensate any polar solvent or solvent mixture still present in the liquid condensate after extraction, and wherein said extraction means is a liquid/liquid extraction column or a mixer/settler, further comprising means for returning said liquid condensate from the extraction means to the inlet of the scrubber section.

12. The apparatus according to claim 9, further comprising a solvent removing means downstream from said extraction means for removing from said liquid condensate any polar solvent or solvent mixture still present in the liquid condensate after extraction.

13. The apparatus according to claim 9, wherein said extraction means is a liquid/liquid extraction column or a mixer/settler.

14. The apparatus according to claim 9, further comprising a solvent removing means downstream from said extraction means for removing from said liquid condensate any polar solvent or solvent mixture still present in the liquid condensate after extraction, and wherein said extraction means is a liquid/liquid extraction column or a mixer/settler.

* * * * *

UNITED STATES PATENT AND TRADEMARK OFFICE
CERTIFICATE OF CORRECTION

PATENT NO. : 7,615,241 B2
APPLICATION NO. : 11/226758
DATED : November 10, 2009
INVENTOR(S) : Kellens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Nineteenth Day of October, 2010

David J. Kappos
*Director of the United States Patent and Trademark Office*